United States Patent Office 3,463,853
Patented Aug. 26, 1969

3,463,853
LUNGWORM DISEASE TREATING COMPOSITION CONTAINING N - DITHIOCARBOXY DERIVATIVES OF AMINO ACIDS AND METHOD OF USING SAME
Hakaru Ueno, Tokyo-to, and Shinsuke Ose, Takarazuka-shi, Japan, assignors to Dainippon Pharmaceutical Co., Ltd., Osaka, Japan, a corporation of Japan
No Drawing. Filed Oct. 11, 1965, Ser. No. 496,740
Claims priority, application Japan, Oct. 26, 1964, 39/60,682/64
Int. Cl. A61k 27/00; C07c 153/03
U.S. Cl. 424—250
10 Claims

ABSTRACT OF THE DISCLOSURE

Compositions for treating animal lungworm disease comprising, as the effective ingredient, an N-dithiocarboxy derivative of an amino acid and methods of administering the same.

---

This invention relates generally to compositions useful in veterinary field. More particularly, it relates to compositions useful in the treatment of animal lungworm disease and with methods of employing such compositions. Still more specifically, it is concerned with veterinary compositions containing N-dithiocarboxy derivatives of amino acids and with the method of treating lungworm disease with these compounds.

Lungworms are parasites on lungs of domestic animals, such as Metastrongylus spp., *Metastrongylus apri* and *Metastrongylus pudendotectus* in swine, *Dictyocaulus viviparus* in cattle or *Dictycaulus filaria* in sheep and goats. Especially lungworms of swine are located in the bronchi and bronchioles of swine, irrespective of age, and the infected swine may suffer from chronic parasitic pneumonia through their lifetime. In infected swine, coughing usually becomes more frequent, appetite is lost, and growth ceases. Young animals are most often and most severely affected and the heavy infection causes their death in about thirty days. Apparently the distribution of lungworms of swine is the most extensive, and in some districts the rate of infection may be 80 or 90 percent. Also it has been evidenced that the lungworms transfer pathogens of infectious diseases, such as swine influenza, hog cholera and so forth. Therefore, the protection and therapy of lungworms of swine are also associated with the prevention of important infectious diseases in swine. Since one of several species of earthworms plays an important part, as an intermediate host, in spreading of the lungworms, the eradication of earthworms is most required. However, at the present state scarcely any preventive measures have been taken against earthworms because of an extensive extent to be treated and expense of drugs to be used. Accordingly, the emphasis has been laid rather on application of anthelmintics than precautionary measure.

Lungworms of cattle are widely distributed in Europe and the United States, and the damage of this disease is the largest one of animal parasite diseases. The parasite belongs to similar nematoda to lungworm of swine and its infection is caused by feeding the pasture.

Heretofore, the classical therapy in which oil of terepine of fumigation of sulfur was used as anthelmintics for lungworms was tested but it was not found to be effective. It was reported in recent years that cyanacethydrazide, guaiacol sulfonic acid potassium salt, piperazine and copper aminoacetate were effective for lungworms of animals, especially of swine. However, it can hardly be expected by using these agents lungworms would be exterminated although they reduce somewhat clinical symptoms. Therefore, the discovery of effective anthelmintics for lungworms has been strongly required.

According to the present invention, it has been now found that N-dithiocarboxy derivatives of amino acids possess unexpectedly high acivity against animal lungworm disease when administered to the animals at low concentrations in diet. It has further been discovered that the compounds are substantially free of toxic side effects when given at the effective dose levels. It is, consequently, an object of this invention to provide a method of treating animal lungworm disease with N-dithiocarboxy derivatives of amino acids. An additional obejct is the use of N-dithiocarboxy derivatives of amino acids in treating lungworm disease. It is a further object to provide compositions containing N-dithiocarboxy derivatives of amino acids as anti-lungworm ingredients. Further objects will be apparent from the following description of the invention.

The N-dithiocarboxy derivatives of amino acids of this invention are pharmaceutically acceptable salts of N-dithiocarboxy amino acid, in which amino acid is selected from the group consisting of taurine, aspartic acid, methionine, glutamic acid, glycine and lysine.

More specifically, the pharmaceutically acceptable salts may, for example, be an alkali metal salt, e.g., sodium or potassium salt, an alkaline earth metal salt, e.g., calcium or magnesium, or piperazine salt.

Some of the compounds: viz, N-dithiocarboxy derivatives of aspartic acid, methionine, glutamic acid, glycine and lysine, are known in the chemical literature, but, it has not heretofore known that they exhibit any activities against animal lungworm. Salts of N-dithiocarboxy taurine are novel compounds and, of course, there is no indication in the prior art that this agent exhibits the significant activity against animal lungworm.

We have found the N-dithiocarboxy derivatives of amino acids effectively control lungworm disease when administered to animals at levels of from about 20 mg. to about 500 mg. per kilogram of body weight per day. The preferred concentration will, of course, depend to some extent upon the kind and the age of animal and severity of infection. For example, when 80 mg./kg./day of sodium salt of N-dithiocarboxy taurine is administered to a swine infected with lungworm for five days, almost all of lungworms can be exterminated without substantially any undesirable side effects.

The compound is usually administered to animals intimately mixed in an element of animal sustenance such as the feed or the drinking water in the form of powder, granule or tablet. Any non toxic orally ingestible carrier may, of course, be used such as starch, lactose or wheat flour. In some cases, it may be administered in the form of suspension or injection.

The following examples are given for the purpose of illustration and not by way of limitation.

EXAMPLE 1

(1) Method of trial

Seven swine were experimentally infected with lungworms. The four swine were administered disodium salt of N-dithiocarboxytaurine for five days at 78.1, 87 and 100 (2 swine) mg./kg. body weight per day, respectively, and the remaining 3 swine were used as control.

EPG (eggs per gm. of feces) of the swine and counted by using the McMaster technique at an interval of five days after treatment. All swine were killed and the effect of the drug was evaluated by comparison between the lungworm counts of the treated swine and those of the control.

(2) Anthelmintic effect (a) Administered dose of the compound and result of examining the egg counts of lungworms of swine:

after the end of the administration to the day of autopsy. By autopsy a few lungworms were found but it was possible that lungworms could be entirely exterminated by the extension of the period after the administration. The control swine No. 5, 6 and 7 had many eggs and many lungworms at the time of autopsy.

(3) The side effect by the administration

The feed containing the agent could be administered completely and appetite of swine was fine. Any side effect was not found.

TABLE I

| Swine No. | Body weight [1] (kg.) | Dose | EPG before administration [2] | EPG after administration | | | |
|---|---|---|---|---|---|---|---|
| | | | | 5 days | 10 days | 10 days | 2 |
| 1 | 32 | 78.1 mg./kg.×5 days | 2,100 | 300 | 0 | 0 | 0 |
| 2 | 46 | 87 mg./kg.×5 days | 50 | 0 | | | |
| 3 | 49 | 100 mg./kg.×5 days | 1,750 | 100 | | | |
| 4 | 32 | do | 2,050 | 2,600 | 400 | 0 | 0 |
| 5 | 37 | }control{ | 800 | 300 | 1,200 | 700 | 500 |
| 6 | 46 | | 2,500 | 3,700 | 2,800 | 3,100 | 3,400 |
| 7 | 20 | | 32,150 | 20,800 | 16,100 | 30,000 | 27,000 |

[1] The body weight of treated swine at the beginning of the administration; that of control at the autopsy.
[2] Average of numbers counted every day for one week before the administration.

(b) Result of autopsy:

TABLE II

| Swine No. | | Numbers of remaining lungworm | | | |
|---|---|---|---|---|---|
| | | Left lung | | Right lung | |
| | | Female | Male | Female | Male | Total |
| 1 | 20 days [1] | 0 | 0 | 1 | 0 | 1 |
| 2 | 5 days | 9 | 3 | 15 | 8 | 36 |
| 3 | 12 days | 0 | 0 | 0 | 0 | 0 |
| 4 | 24 days | 1 | 0 | 0 | 3 | 4 |
| 5 | }Control{ | 211 | 175 | 93 | 120 | 599 |
| 6 | | 631 | 422 | 780 | 290 | 2,123 |
| 7 | | [2] ∞ | | ∞ | | ∞ |

[1] The time from the administration to autopsy.
[2] Too many to be counted.

EXAMPLE 2

(1) Method of trial

Three cattle infected with lungworms were used. The two cattle were administered disodium salt of L-N-dithiocarboxy taurine for five days at 50 and 75 mg./kg. body weight per day, respectively and the remaining cattle were used as control.

LPG (larvae per gm. of feces) of the cattle was counted by the Coffin's method and the general symptom was also observed.

(2) Anthelmintic effect

Administered dose of the compound and result of examination:

TABLE III

| Cattle No. | Body weight (kg.) | Dose | LPG before administration | LPG after administration | | | | |
|---|---|---|---|---|---|---|---|---|
| | | | | 5 days | 10 days | 15 days | 20 days | 25 days |
| 1 | 132 | 50 mg./kg.×5 days | 51 | 28 | 2 | 1 | 3 | 2 |
| 2 | 125 | 75 mg./kg.×5 days | 73 | 24 | 1 | [1] (0) | (0) | (0) |
| 3 | 137 | Control | 45 | 53 | 51 | 48 | 55 | 42 |

[1] (0) means below one.

As shown in Table I and II, in spite of severe infection from which swine No. 1, 3 and 4 were suffering before the administration, after the administration eggs of the lungworm disappeared rapidly and one, zero and four lungworms were found by autopsy in No. 1, 3 and 4, respectively. From the result, the compound was evaluated to be excellent. The eggs in feces of No. 2 were not so many (50 EPG) before the administration and at the final day of the administration eggs could not be found by using McMaster technique, although only several eggs were found by using the floatation method. But the eggs entirely disappeared from the 3rd day As shown in Table III, LPG could not become negative at the doses used but LPG reduced greatly 10 days after the administration and the increase of LPG was not observed for 15 days after that. From the result, it was estimated that the majority of larvae was exterminated. General symptoms, such as coughing became less serious and the appetite was improved. On the other hand, many larvae were found in the feces of the control cattle, which continued to show the symptom of lungworm disease. Any side effect by the administration of this compound was not observed.

EXAMPLE 3

Four swine which were experimentally infected with lungworms were administered sodium salt of L-N-dithiocarboxyaspartic acid for five days at 100 mg./kg. body weight per day. The anthelmintic effect was examined by the same method as Example 1. The following table shows the result. Any side effect was not observed.

TABLE IV

| Swine No. | Body weight (kg.) | Dose | EPG before administration | EPG after administration | | | |
|---|---|---|---|---|---|---|---|
| | | | | 5 days | 10 days | 15 days | 20 days |
| 1 | 39 | 100 mg./kg.×5 days | 1,925 | 200 | 0 | 0 | 0 |
| 2 | 47 | do | 1,900 | 800 | 0 | 0 | 0 |
| 3 | 41 | do | 2,275 | 2,400 | 500 | 0 | 0 |
| 4 | 32 | do | 2,300 | 1,700 | 200 | 0 | 0 |

EXAMPLE 4

Three swine which were experimentally infected with lungworms were administered calcium salt of DL-N-dithiocarboxymethionine for five days at 100 mg./kg. body weight per day. The anthelmintic effect was examined by the same method as Example 1. The following table shows the result. Any side effect was not observed.

TABLE V

| Swine No. | Body weight (kg.) | Dose | EPG before administration | EPG after administration | | | |
|---|---|---|---|---|---|---|---|
| | | | | 5 days | 10 days | 10 days | 20 days |
| 1 | 43 | 100 mg./kg.×5 days | 3,250 | 2,050 | 300 | 0 | 0 |
| 2 | 44 | do | 2,085 | 600 | 0 | 0 | 0 |
| 3 | 36 | do | 2,280 | 1,250 | 100 | 0 | 0 |

EXAMPLE 5

Six gm. of taurine were added to a solution of 3.84 gm. of sodium hydroxide dissolved in 80 ml. of ethanol. To this mixture was added a solution of 3.6 gm. of carbon disulfide in ethanol. After distilling off the solvents, the residue was recrystallized from a mixture of methanol and ether to give disodium salt of N-dithiocarboxy taurine as colorless prisms. The yield: 8 gm., the melting point; 240–243° C. (dec.). This compound is soluble in water and methanol, and hardly soluble in ethanol.

EXAMPLE 6

A mixture of 4.5 gm. of DL-methionine, 2.2 gm. of calcium hydroxide and 2.5 gm. of carbon disulfide in water was stirred at room temperature. After the dissolution of calcium hydroxide, the water was evaporated off. To the residue was added small amount of water and the solution was filtered. The oily product which had been separated off by adding ethanol to the filtrate was isolated by decantation and dried to give calcium salt of DL-N-dithiocarboxymethionine. The yield: 5.7 gm., the melting point: 240° C. (dec.).

The following substances have been prepared using methods similar to those described in Examples 5 and 6:

Calcium salt of N-dithiocarboxytaurine, M.P. 300° C. (dec.).

Dipotassium salt of N-dithiocarboxytaurine, M.P. 258–261° C. (dec.).

Magnesium salt of N-dithiocarboxytaurine, M.P. 262° C. (dec.).

Piperazine salt of N-dithiocarboxytaurine, M.P. 166–167° C. (dec.).

Trisodium salt of L-N-dithiocarboxyaspartic acid, M.P. 265° C. (dec.).

Disodium salt of DL-N-dithiocarboxymethionine, M.P. 203° C. (dec.).

Disodium salt of DL-N-dithiocarboxyglycine, M.P. 175° C. (dec.).

Calcium salt of DL-N-dithiocarboxyglycine, M.P. 242° C. (dec.).

Trisodium salt of L-N,N'-bis(dithiocarboxy)lysine, M.P. 226–230° C. (dec.).

Trisodium salt of L-N-dithiocarboxyglutamic acid, M.P. 171–173° C. (dec.).

What is claimed is:

1. The method of treating an animal having lungworm disease which comprises orally administering to said animal a therapeutically effective dose of a pharmaceutically acceptable salt of N-dithiocarboxyamino acid, wherein said amino acid is selected from the group consisting of taurine, aspartic acid, methionine, glutamic acid, glycine and lysine.

2. The method of treating an animal having lungworm disease which comprises orally administering to said animal from about 20 mg. to about 500 mg. per kg. of animal body weight per day of a pharmaceutically acceptable salt of N-dithiocarboxyamino acid, wherein said amino acid is selected from the group consisting of taurine, aspartic acid, methionine, glutamic acid, glycine and lysine.

3. The method of treating an animal having lungworm disease which comprises orally administering to said animal from about 20 mg. to about 500 mg. per kg. of animal body weight per day of a pharmaceutically acceptable salt of N-dithiocarboxytaurine.

4. The method of claim 3, wherein said salt is a member selected from the group consisting of disodium salt, dipotassium salt, calcium salt, magnesium salt and piperazine salt.

5. The method as defined in claim 3, wherein said salt is the disodium salt of N-dithiocarboxytaurine.

6. A composition for treating an animal having lungworm disease which comprises a pharmaceutically acceptable salt of N-dithiocarboxy amino acid and nontoxic orally ingestible carrier, said amino acid being a member of the group consisting of taurine, aspartic acid and lysine and said salt being present in an amount sufficient to treat said disease.

7. A composition as defined in claim 6, wherein said salt is selected from the group consisting of an alkali metal salt and piperazine salt.

8. A composition for treating an animal having lungworm disease which comprises a pharmaceutically acceptable salt of N-dithiocarboxytaurine and a nontoxic orally ingestible carrier, said salt being present in an amount sufficient to treat said disease.

9. A composition as defined in claim 8, wherein said salt is the disodium salt of N-dithiocarboxytaurine.

10. A composition as defined in claim 8, wherein said salt is an alkali metal salt.

References Cited

Chem. Abstracts, 51: 1368a; 51: 13756a; 51: 5308a; 52: 18570e.

ALBERT T. MEYERS, Primary Examiner

STANLEY J. FRIEDMAN, Assistant Examiner

U.S. Cl. X.R.

260—208, 513, 534; 424—286, 319